Nov. 2, 1948.                P. SUSSENBACH                2,452,805
        COMPOSITION OF MATTER FOR SEALING SPOT-WELDED JOINTS
                        Filed Oct. 14, 1944
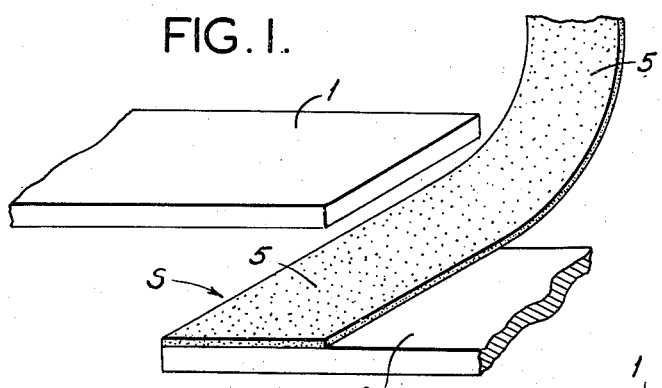
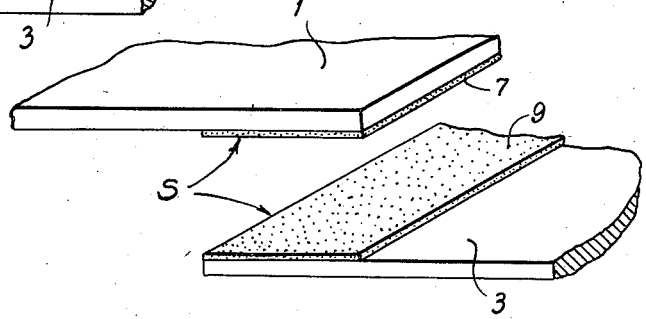
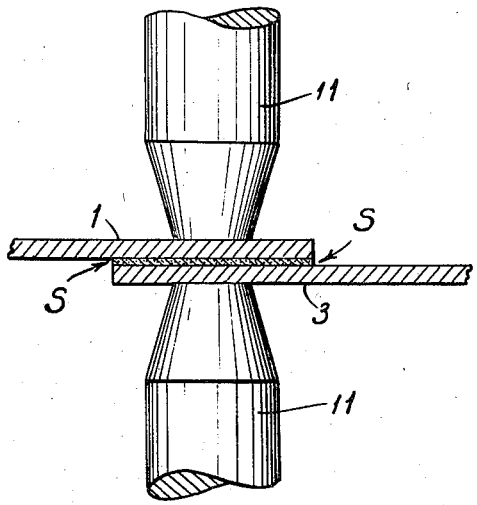
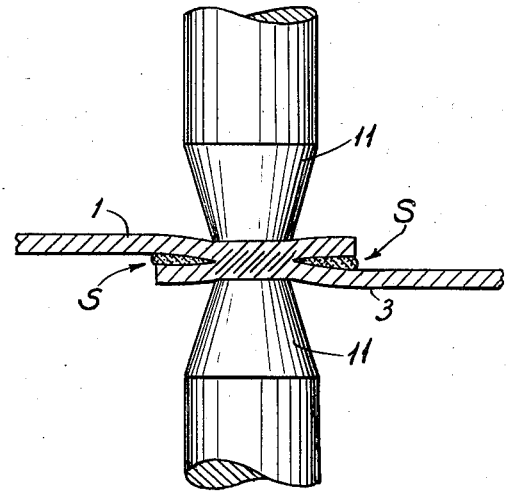
Paul Sussenbach,
    Inventor.
Haynes and Koenig,
    Attorneys.

Patented Nov. 2, 1948

2,452,805

UNITED STATES PATENT OFFICE 2,452,805

COMPOSITION OF MATTER FOR SEALING SPOT-WELDED JOINTS

Paul Sussenbach, St. Louis, Mo., assignor to The Presstite Engineering Company, St. Louis, Mo., a corporation of Missouri Application October 14, 1944, Serial No. 558,721

1 Claim. (Cl. 106—193)

This invention relates in general to seals, and with regard to certain more specific features, to seals for spot-welded joints and the like.

Among the several objects of the invention may be noted the provision of an improved permanent sealer between spots in a spot-welded joint, which sealer may conveniently be applied before welding; the provision of a sealer which while it is applied before welding does not interfere with the welding operation or substantially increase the current required and which after the welding operation continues to form a close integument around the spot welds in the resulting joint; the provision of a sealer of the class described which allows the welded members better to be held and aligned during the welding process; and the provision of a sealer of this class which during welding does not form blow holes in it nor is it prone to leak thereafter. Other objects will be in part obvious and in part pointed out hereinafter.

The invention accordingly comprises the elements and combinations of elements, features of composition, and the proportions thereof, which will be exemplified in the substances and products hereinafter described, and the scope of the application of which will be indicated in the following claim.

In the accompanying diagrammatic drawings, in which are illustrated several of various possible embodiments of the invention, Fig. 1 is an exploded view showing two plates about to be brought together for welding and illustrating one mode of application of my new sealing material;

Fig. 2 is a view similar to Fig. 1 showing another mode of application of the new material;

Fig. 3 is an enlarged vertical section showing two plate members with interposed sealing material held between two electrodes as at the start of a welding operation; and, Fig. 4 is a view similar to Fig. 3 but showing conditions at the end of the welding operation with the electrodes about to be removed.

Similar reference characters indicate corresponding parts throughout the several views of the drawings.

Sealer compounds have heretofore been made which are adapted to be applied before welding between members welded, but these are of such a nature that when pressure is applied to the electrodes the sealer is pushed aside, allowing the members under the welding operation to be squeezed into contact for establishing the welding current. One unfavorable result has been the excessive thinness of the sealer in order for it to recede from or be pushed from the welding area to allow electrical contact. Another disadvantage was the sputtering action which often occurred with resulting blow holes in the sealer. Furthermore, the character of these prior sealers was not such as to allow the most desirable firmness and precision in holding together the plates during welding. They also required large amounts of expensive thinners. The present invention overcomes these and other similar disadvantages.

Referring now more particularly to the drawings, numerals 1 and 3 indicate metal plates for example, the margins of which are to be spot welded. The sealer material will be generically indicated by the letter S. In Fig. 1 this material is extruded and of a tape-like form 5, which, as indicated, may be inserted into position between the margins prior to bringing the plates 1 and 3 together.

In Fig. 2 the sealer material S is in two parts 7 and 9, which have been brushed, sprayed or flowed on the margin of each plate prior to bringing the plates together. Application in the case of Fig. 2 might also be to one plate only. Thus it is clear that the material may be brushed, sprayed, flowed, knifed or gunned (extruded) into position.

An exemplary list of ingredients and proportions in the sealer is as follows:

*Sealer ingredient proportions*

| Item | Function | Ingredients | Percentage by weight |
|---|---|---|---|
| 1 | Thermoplastic | Cellulose Nitrate | 17.3 |
| 2 | Diluents and Solvents | Butyl Acetate | 9.5 |
|  |  | Butyl Lactate | 6.6 |
|  |  | Glycol-mono-ethyl-ether | 6.6 |
|  |  | Glycol-mono-methyl-ether | 6.6 |
| 3 | Plasticizer | Castor Oil | 48.0 |
| 4 | Electrical Conductors | Aluminum Flakes, Varnish Grade | 4.5 |
|  |  | Acetylene Carbon Black | 0.6 |
| 5 | Stabilizer | Di Cyclohexylamine | 0.3 |
|  |  |  | 100.0 |

The above ingredients are thoroughly mixed and dispersed. The cellulose nitrate of item 1 is of the lacquer type. It is to be understood that other suitable thermoplastic resins may be used.

The diluents and solvents of item 2 are fugitive so that the material will remain fluid only long enough for application. The period of fluidity may be controlled by variations in the solvents and diluents. Some variation is also necessary for different thermoplastics. Thus the list of diluents and solvents is so selected as to give the setting time desired in view of the plastic used. Those indicated allow for a few moments (say fifteen minutes) before setting of the material takes place to a consistency wherein it will not readily flow but wherein it is still plastic.

The plasticizer of item 3 serves to control the body characteristics of the material so that it is not flowing after setting, except upon heating. It is to be understood that various grades of castor oil may be blended to accomplish specific results under various temperature conditions. Also other plasticizing agents may be used.

The electrical conductors of item 4 may be both used, as indicated, or either of them, depending upon certain requirements to be discussed hereafter. Other suitable ones may also be used.

The stabilizer of item 5 is relatively unessential, though desirable. It prevents corrosion of any metal container in which the material is shipped.

After the sealing material has been inserted between the parts to be welded and has set (as indicated in Figs. 1 and 2), the parts are brought together (as indicated in Fig. 3) and the welding electrodes 11 are applied under the usual pressure. At this time the sealing material preferably has more or less set but is not bone hard. Thus it will not initially be squeezed out mechanically. However, it remains plastic, which is advantageous in holding the plates in desired relative positions and in assuring good electrical contact. Since pressure will not cause the sealing material to squeeze out laterally, the material will not permit the plates immediately to come into direct electrical contact. In this respect the material is different from prior materials. It is because this is true that the dispersed conductor materials have been introduced, such as the aluminum flakes and acetylene black of item 4 in the above table.

These conductors carry the welding current and, along with the adjacent parts of members 1 and 3, heat up. It will be noted that since the sealer S is not absolutely hard at the time that the current is applied but is more or less plastic, the stated good electrical contact is obtained over the desired area.

When the current is turned on, the conditions shown (exaggerated) in Fig. 4 come about, the electrodes 11 being under some mechanical pressure. The heating in the members 1 and 3 and in the conductors of item 4 causes the previously set thermoplastic to melt, thus allowing it to flow away from where the spot weld occurs. Thus conduction is initially through the sealer but finally through the contact between the plates 1 and 3. Unlike prior sealers, the present one does not cause sputtering in response to full current through the plates and consequently there are no blow holes formed around the spot weld. Consequently no leakage occurs through the joint when finished, because the sealer remains everywhere in effective position around the spot weld. After the current is turned off and the electrodes removed, the assembly cools and the sealer again assumes a solidified flexible condition.

Referring again to the solvents and diluents, it is desirable that these be chosen and proportioned as in the table so that a small amount of them remains in the solidified material when in welding position prior to welding. This improves the welding action. They are driven out upon welding so that the sealer sets up solidly after welding, although it remains plastic to some degree.

One advantage of the invention is that the sealing material does not insert resistance into the weld requiring any substantial increase in current. Furthermore, the weld per se is not deleteriously affected by the composition. In this respect it is to be noted that if the introduction of aluminum flakes causes any undesirable alloys to form, acetylene black alone may be used and depended upon for the conducting medium. Where admissible, the mixture of conductors indicated is preferable because conductivity is increased. Other carbon particles may be used, but acetylene carbon has lower resistance than most other practically useful carbons.

My new material is much bulkier, more filling and firmer after welding than the old materials, which squeeze out with some loss, making less quantity available for ultimate sealing purposes. In other words, the present invention provides a greater mass of plastic damming sealing material in the finished joint.

A manufacturing advantage is that the material requires less thinner than prior materials of the class.

In view of the above, it will be seen that the several objects of the invention are achieved and other advantageous results attained.

As many changes could be made in the above without departing from the scope of the invention, it is intended that all matter contained in the above description or shown in the accompanying drawings shall be interpreted as illustrative and not in a limiting sense.

I claim:

A sealing composition for use between metal parts to be spot-welded, comprising by weight approximately 17% of cellulose nitrate; approximately 30% of a fugitive solvent mixture comprising butyl acetate, butyl lactate, glycol-mono-ethyl-ether and glycol-mono-methyl-ether; approximately 48% of castor oil as a plasticizer; and approximately 5% of at least one electrical conducting material selected from the class consisting of carbon black and aluminum flakes dispersed therethrough.

PAUL SUSSENBACH.

REFERENCES CITED

The following references are of record in the file of this patent:

UNITED STATES PATENTS

| Number | Name | Date |
| --- | --- | --- |
| 1,124,012 | Graves | Jan. 5, 1915 |
| 1,603,086 | McKee | Oct. 12, 1926 |
| 1,913,214 | Schuhmann | June 6, 1933 |
| 2,059,310 | Bogin | Nov. 3, 1936 |
| 2,113,449 | Hoffman et al. | Apr. 5, 1938 |
| 2,280,135 | Ward | Apr. 21, 1942 |
| 2,361,220 | Loftis | Oct. 24, 1944 |